US011599746B2

(12) United States Patent
Yang et al.

(10) Patent No.: US 11,599,746 B2
(45) Date of Patent: Mar. 7, 2023

(54) LABEL SHIFT DETECTION AND ADJUSTMENT IN PREDICTIVE MODELING

(71) Applicant: Microsoft Technology Licensing, LLC, Redmond, WA (US)

(72) Inventors: Jilei Yang, Sunnyvale, CA (US); Yu Liu, San Mateo, CA (US); Parvez Ahammad, San Jose, CA (US); Fangfang Tan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 16/916,706

(22) Filed: Jun. 30, 2020

(65) Prior Publication Data

US 2021/0406598 A1 Dec. 30, 2021

(51) Int. Cl.
*G06N 20/00* (2019.01)
*G06V 10/75* (2022.01)
*G06K 9/62* (2022.01)

(52) U.S. Cl.
CPC ........... *G06K 9/6256* (2013.01); *G06K 9/623* (2013.01); *G06K 9/6227* (2013.01); *G06N 20/00* (2019.01); *G06V 10/751* (2022.01)

(58) Field of Classification Search
CPC .... G06K 9/6256; G06K 9/6227; G06K 9/623; G06K 9/6228; G06K 9/6232; G06K 9/6265; G06N 20/00; G06V 10/751
USPC ......... 706/12, 45, 46, 52; 704/200, E15.029, 704/231, 251, 243, 255, 256; 717/104, 717/109; 382/100, 151, 155, 156, 157, 382/158, 181, 190, 199, 224
See application file for complete search history.

(56) References Cited

U.S. PATENT DOCUMENTS 10,209,974 B1 * 2/2019 Patton ....................... G06F 8/60
11,295,163 B1 * 4/2022 Schoner .................. G06T 11/00
2020/0134504 A1 * 4/2020 Li ....................... H04L 63/1425
2020/0184278 A1 * 6/2020 Zadeh .................. G06K 9/6264
2020/0258182 A1 * 8/2020 Bentley ............... G06F 16/2379

(Continued)

OTHER PUBLICATIONS

Hyndman, et al., "Forecasting with Exponential Smoothing: The State Space Approach", Published By Springer, 2008, 3 Pages.

(Continued)

*Primary Examiner* — Sheela C Chawan
(74) *Attorney, Agent, or Firm* — NDWE, LLP

(57) ABSTRACT

Techniques for detecting label shift and adjusting training data of predictive models in response are provided. In an embodiment, a first machine-learned model is used to generate a predicted label for each of multiple scoring instances. The first machine-learned model is trained using one or more machine learning techniques based on a plurality of training instances, each of which includes an observed label. In response to detecting a shift in observed labels, for each segment of one or more segments in multiple segments, a portion of training data that corresponds to the segment is identified. For each training instance in a subset of the portion of training data, the training instance is adjusted. The adjusted training instance is added to a final set of training data. The machine learning technique(s) are used to train a second machine-learned model based on the final set of training data.

18 Claims, 5 Drawing Sheets

(56) References Cited

U.S. PATENT DOCUMENTS

2020/0279113 A1* 9/2020 Yanagi ................. G06V 10/751

OTHER PUBLICATIONS

Lipton, et al., "Detecting and Correcting for Label Shift with Black Box Predictors", In Proceedings of the 35th International Conference on Machine Learning, Jul. 10, 2018, 11 Pages.

* cited by examiner

500
MAIN MEMORY 506
ROM 508
STORAGE DEVICE 510
BUS 502
PROCESSOR 504
COMMUNICATION INTERFACE 518
NETWORK LINK 520
LOCAL NETWORK 522
HOST 524
ISP 526
INTERNET 528
SERVER 530
DISPLAY 512
INPUT DEVICE 514
CURSOR CONTROL 516

LABEL SHIFT DETECTION AND ADJUSTMENT IN PREDICTIVE MODELING

TECHNICAL FIELD

The present disclosure relates generally to machine learning and, more particularly, to automatically detecting shift in output labels and automatically adjusting labels in training data based on the detection.

BACKGROUND

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with one or more objects. The statistical model is trained based on multiple attributes described herein. In machine learning parlance, such attributes are referred to as "features." To generate and train a statistical model, a set of features is specified and a set of training data is identified.

The accuracy of a machine-learned model largely depends on the quality and quantity of the training data. For example, if there are not enough training instances in the training data, then the model will not be able to make accurate predictions for inputs that are similar (but not identical) to the training instances. As another example, if the training instances do not reflect real-world scenarios, then the resulting model will not be able to make accurate predictions.

Changes in an environment for which predictions are made is natural and common. For example, a cloud service that monitors performance of, and resource consumption by, cloud applications may implement a model to predict how many computer resources of one or more types to allocate to each cloud application based on the cloud application's performance. Cloud application performance may change over time in response to changes in how the cloud application is used (e.g., what features are being leveraged), how frequently it is being relied upon by other applications and/or users, and the number of machines that are available for the cloud application to execute on.

Usually, changes in the environment cause minor shifts in the output labels. This is referred to as a shift in label distribution. "Labels" refer to not only the labels of training instances, but also to real-world results, irrespective of the output (predictions) of a machine-learned model. Input labels are labels that are part of the training data while output labels are actual labels as observed in historical results. For example, a machine-learned model is trained to predict whether an entity will perform a particular action in response to one or more events occurring. Also, about twenty entities typically perform the particular action each week, but only ten entities actually perform that action in the most recent week. Thus, there is a (output) label shift from twenty to ten. A shift in label distribution results in a decrease in the accuracy of the machine-learned model. For minor shifts in label distribution, a refresh of the machine-learned model is sufficient. A refresh involves generating new training instances based on recent data and retraining the machine-learned model based on the new training instances and older training instances.

However, for significant shifts in label distribution, model refreshment might not work well because a dramatic change in label distribution probably indicates a large change in feature weights or coefficients to derive the correct label from the feature set. Thus, the model learned from the historical data is likely to provide incorrect predictions. However, to completely rebuild the model, there is not sufficient recent data to generate new training instances, since most of the data was collected before the factor(s) that led to the significant label shift. Thus, refreshing the model may still result in inaccurate predictions on newly measured scoring data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically adjusting training data in response to a detection of shift in labels are provided. In one technique, historical data is automatically analyzed to generate and train a forecasting model. The forecasting model is used to predict an aggregate value of a particular metric. The predicted aggregate value is compared to an actual or observed aggregate value of the particular metric. If the difference between the two aggregate values is significant, then a shift in labels is detected and triggers an adjustment of training data upon which a machine-learned model was trained. In a related technique, the training data is divided based on segments and the training instances of different segments are adjusted differently. For example, the importance weights of instances in one segment may be adjusted positively while the importance weights of instances in another segment may be adjusted negatively.

Embodiments improve computer-related technology by automatically and, in a data-driven and scientific way, adjusting instances in training data to improve the accuracy of models in light of significant shifts in label distribution. Embodiments involve a novel model treatment system that comprises two main components, where model label shift detection provides directional guidance to model label shift adjustment, and model label shift adjustment is a follow-up step to model label shift detection.

Additionally, embodiments leverage forecasting models to auto-detect model label shift even though the main purpose of forecasting has been producing an accurate prediction in order to take a prompt action, such as weather forecasting and economic forecasting. In contrast, the forecasting model(s) described herein serve as a powerful and scientific tool to detect target label distribution shift. The forecasting results are just an intermediate step. Using the forecasting results to further identify the model label shift and adjust the model accordingly is a primary goal, which is inherently different from prior usages of forecasting.

Furthermore, embodiments leverage a novel segment-wise variation of model label shift adjustment. In contrast, existing model label shift adjustment approaches do not take segmentation factor into consideration. However, in many real-world problems, the segmentation factor matters greatly since the extent of label shift could vary significantly across different segments.

System Overview

Figure 1:
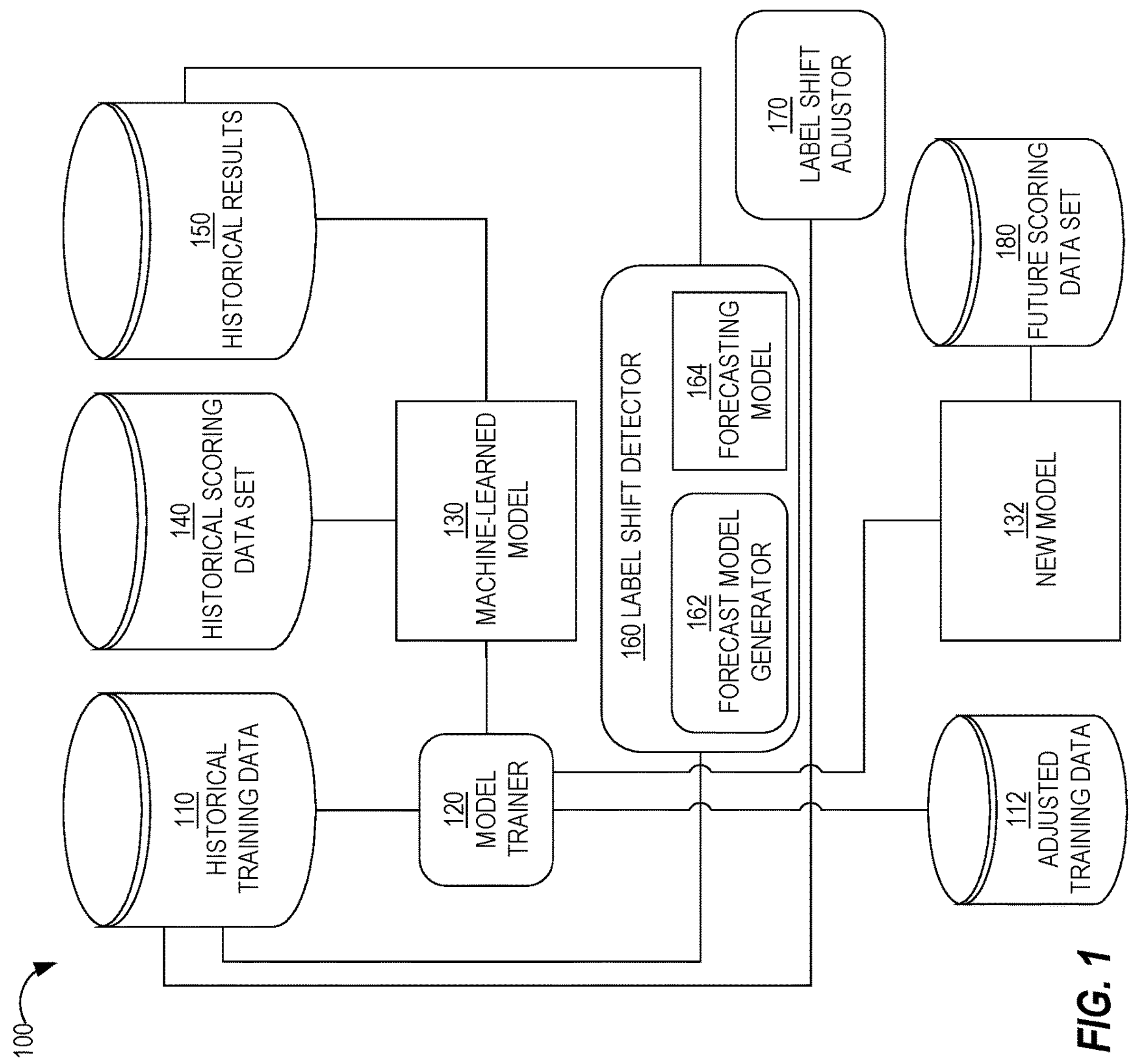
FIG. 1 is a block diagram that depicts an example model training system for detecting label shift and adjusting training instances, in an embodiment.

FIG. 1 is a block diagram that depicts an example model training system 100 for detecting label shift and adjusting training instances, in an embodiment.

Model training system 100 includes historical training data 110, a model trainer 120, a machine-learned model 130, a historical scoring data set 140, historical results 150, a label shift detector 160, a label shift adjustor 170, and a future scoring data set 180. Model trainer 120, label shift detector 160, and label shift adjustor 170 are implemented in software, hardware, or any combination of software and hardware. Each of model trainer 120, label shift detector 160, and label shift adjustor 170 may be implemented on a single computing device, individually on multiple computing devices, or distributed on multiple computing devices where different functionality of each component is implemented on different computing devices.

Model trainer 120 takes historical training data 110 as input to train machine-learned model 130. Each training instance in historical training data 110 includes a set of feature values and a label. The features and label of machine-learned model 130 vary depending on what is being predicted. For example, machine-learned model 130 may predict whether computer resource utilization of a cloud system is about to exceed capacity of the cloud system (in which case current resource utilization statistics and current capacity statistics may be features of the model), whether a user is going to perform a particular (e.g., online) action in response to certain stimuli (in which case attributes of the user and attributes of the stimuli are features of the model), or whether a weather event is going to occur given certain known conditions (in which case current weather conditions such as temperature, wind, humidity, barometric pressure may be features of the model).

Machine-learned model 130 may be a binary classification model (that predicts whether a certain entity or event belongs to one of two classes), a multi-class classification model (that predicts whether a certain entity or event belongs to one of multiple classes), or another type of model, such as a regression model that outputs a continuous quantity, such as a specific dollar value for which a house is predicted to sell.

Historical scoring data set 140 comprises multiple scoring instances, each comprising a set of feature values that is input into machine-learned model 130. For each scoring instance, machine-learned model 130 computes a predicted label or a score reflecting a prediction, whether the predicted label is a classification label or a regression label. The predicted labels computed by machine-learned model 130 may be recorded in the appropriate scoring instances in historical scoring data set 140.

Model training system 100 also records actual or observed labels in historical results 150. The observed labels in historical results 150 are different than the predicted labels that were generated by machine-learned model 130 based in input from historical scoring data set 140. Historical results 150 indicate observed or actual events or (e.g., user) behavior. Each observed label corresponds to a scoring instance in historical scoring data set 140 (or a training instance in historical training data 110). For example, if an predicted label of a particular scoring instance (in historical scoring data set 140) is a score indicating a likelihood that a particular user will perform a particular online action in response to a notification or message and the particular user did not perform the particular online action, then the observed action is recorded, in historical results 150, as a value indicating a negative result, such as a '0.' On the other hand, if the particular user did perform the particular online action, then the observed action is recorded, in historical results 150, as a value indicating a positive result, such as a ' 1.'

Observed labels may be automatically generated by one or more processes that determine whether a certain event or action occurred. In some scenarios, the observed label is generated based on what is not found in a data set. For example, if there is no record of a user responding to a notification within two days of receiving the notification, then an observed label indicating that the event did not occur is generated and recorded.

Observed labels are automatically associated with a scoring instance that was used to generate a predicted label. For example, if the event being predicted is a user action, then the user is associated with a scoring instance identifier or with a user identifier and a model identifier. Each scoring instance is associated with a scoring instance identifier or a combination of a model identifier and a user identifier. In this way, observed labels in historical results 150 are mapped to (or associated with) scoring instances in historical scoring data set 140.

At least some of the observed labels in historical results 150 may be for scoring instances that are not yet reflected in training instances in historical training data 110. In other words, at least a portion of historical results 150 may be newer or "fresher" data than training instances found in historical training data 110. For example, historical training data 110 may include observed labels that were generated between January and December of one year while historical results 150 may include observed labels that were generated between October of the same year and June of the following year. Alternatively, the observed labels in historical training data 110 may be a strict subject of the observed labels in historical results 150.

Label shift detector 160 (described in more detail herein) analyzes historical results 150 to detect shift in the distribution of observed labels, which detecting is described in more detail below. Label shift detector 160 includes a forecast model generator 162 and a forecasting model 164 that forecast model generator 162 generates. Although only a single forecasting model is depicted, forecast model generator 162 may generate multiple forecasting models based on historical data, such as one for each segment of multiple segments.

If, after analyzing historical results 150, label shift detector 160 detects significant label shift, then label shift adjustor 170 (also described in more detail herein) adjusts or modifies importance weights of training instances in historical training data 110 to generate adjusted training data 112. Model trainer 120 trains a new model 132 based on adjusted training data 112. The new model 132 is applied to each scoring instance in future scoring data set 180 (for which labels are not yet known at the time of label shift detection and adjustment) in order to generate output labels or predictions therefor.

Example Process

Figure 2:
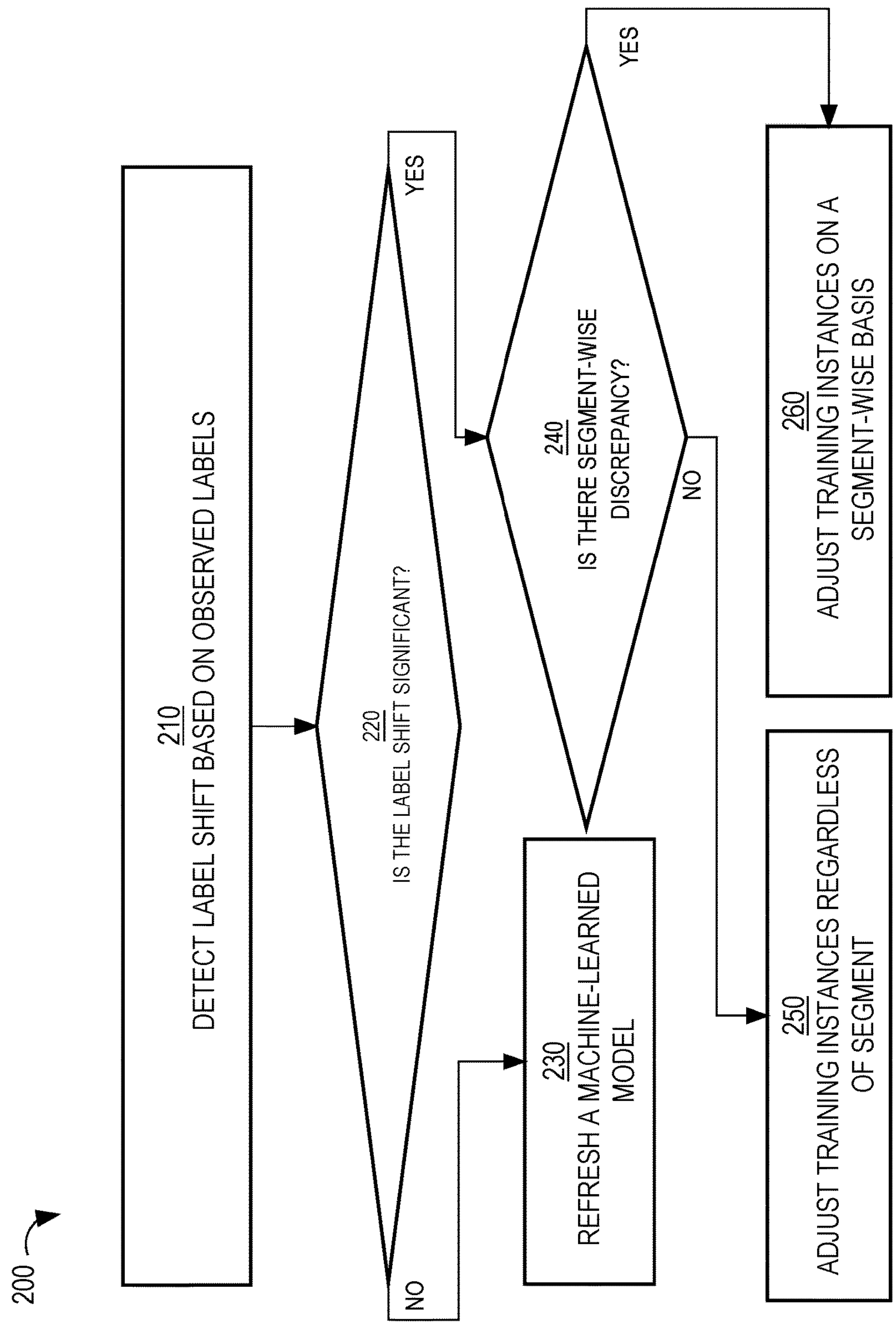
FIG. 2 is a flow diagram that depicts an example process for label shift detection and adjustment, in an embodiment.

FIG. 2 is a flow diagram that depicts an example process 200 for label shift detection and adjustment, in an embodiment. Process 200 may be implemented by different components of model training system 100.

At block 210, label shift is detected (e.g., by label shift detector 160) based on historical results 150. Label shift may be detected using one or more forecasting models that are trained based on observed labels, some of which may be reflected in historical results 150.

At block 220, it is determined whether the label shift is significant. Label shift may be considered "significant" if an aggregate output value is outside a certain range of values or if a shift measure is above a particular threshold, for example, if an aggregate is outside a 95% confidence interval. If the determination is negative, then process 200 proceeds to block 230, where machine-learned model 130 is refreshed based on historical scoring data set 140 and historical results 150. If the determination is positive, then process 200 proceeds to block 240.

At block 240, it is determined whether there is segment-wise discrepancy. A segment is a grouping of one or more entities (e.g., people) that share one or more characteristics in common. A segment may be defined or influenced by a set of one or more values for a set of one or more features of machine-learned model 130. For example, if the feature that defines a segment is geography and there are five possible values for geography, then there are five segments, or groups of people that live in the corresponding geographic location. As another example, if the set of features that define a segment include industry and geography and there are five possible values for industry and two possible values for geography, then there are 2×5=10 segments, or groups of people, each group sharing a unique pair of industry-geography values in common.

Block 240 may be performed by label shift detector 160 or by another component of model training system 100. Segment-wise discrepancy refers to the fact that the shift in label distribution among different segments of entities is substantially different. For example, if, based on historical results 150, overall label shift is outside a 95% confidence interval and the magnitude of label shift of each segment within historical results 150 is similar, then there is unlikely to be significant segment-wide discrepancy. On the other hand, if, based on historical results 150, overall label shift is outside a 95% confidence interval and the label shift of half of the segments within historical results 150 is not outside the 95% confidence interval, then there is segment-wide discrepancy.

If the determination in block 240 is negative, then process 200 proceeds to block 250 where all (or most) training instances in historical training data 110 are adjusted or modified, regardless of segment. If the determination in block 240 is positive, then process 200 proceeds to block 260 where training instances in historical training data 110 are adjusted on a segment-wise basis. For example, training instances corresponding to one segment are adjusted a first amount while training instances corresponding to another segment are adjusted a second amount.

Label Shift Detection

Label shift detector 160 detects shifts in the distribution of observed labels over time. Detecting such a shift may be performed in one or more ways. For example, if the ratio of values of observed labels is relatively constant over time (i.e., with very little variation), then a simple difference may be made between (1) the ratio of values of observed labels during a first time period and (2) the ratio of values of observed labels during a second (subsequent) time period. A shift metric may be defined based on the difference, depending on the possible values of the output labels. For example, in a binary classification scenario, a distribution of 30/70 compared to a distribution of 60/40 represents a 30-point shift. Any shift over 15 may be considered significant.

However, the ratio of values of observed labels typically vary significantly over time. Therefore, a simple comparison between two values will, in many cases, be insufficient in detecting significant label shift.

Thus, in an embodiment, one or more forecasting models are trained based on a portion of historical training data 110 and/or a portion of historical results 150. The data upon which a forecasting model is trained is time series data comprises multiple data points, each corresponding to a different period of time and corresponding to an aggregate of observed labels (in historical training data 110 and/or historical results 150) that occurred in the corresponding period of time. For example, observed labels may be aggregated on a daily basis, a weekly basis, or a monthly basis. The aggregation may be a sum, such as a daily sum or a weekly sum, or an average/median value, such as a daily average on a weekly basis or a weekly average on a monthly basis. Thus, each data point in the times series data reflects an aggregate value.

The one or more forecasting models take into account historical (and presumably "natural") trends reflected in changes in distribution of observed labels. The portions of historical training data 110 and/or historical results 150 upon which the forecasting models are trained reflect a period of time before a particular point of time, referred to herein as a "candidate shift point in time."

A candidate shift point in time refers to a point in time that may correspond to a start in a potential shift in label distribution. A candidate shift point in time may be identified based on input from a user, such as a developer of machine-learned model 130 or a data scientist. For example, a user may guess, based on preliminary reports or data, that a significant shift in label distribution has begun. As another example, a user, reading news reports about a global event, may anticipate that machine-learned model 130 will start performing poorly. Additionally or alternatively, label shift detector 160 automatically identifies multiple candidate shift points in time. For example, each day in the past may act as a candidate shift point in time. Thus, label shift detector 160 may perform shift detection on a daily basis where, for each day it executes, label shift detector 160 uses a week before the current day as the candidate shift point in time.

Once a forecasting model is trained based on observed labels generated prior to the candidate shift point in time, the forecasting model is leveraged to produce a forecast or a prediction of one or more labels after the candidate shift point in time. Input into the forecasting model may be a number, indicating a number of forecasted values. For example, if data upon which the forecasting model is trained is a weekly sum over the last fourteen months, then an input value of three indicates that the forecasting model is to produce three forecasted values, each representing a weekly sum and one for each of three weeks after the candidate shift point in time.

Label shift detector 160 compares the forecast to observed values that are based on observed labels that were generated (or that reflect events or activity that occurred) after the candidate shift point in time. Like forecast values, observed values may reflect aggregated data, except that the data that is aggregated is from historical results 150. For example, if each forecast value is a daily sum, then an observed value is also a daily sum.

If one or more of the forecast values are significantly different than the corresponding observed label(s), then label shift detector 160 determines that a significant shift occurred. A measure of significance may vary from one implementation to another. For example, if an observed value is greater than 20% different from a forecast value, then the shift is significant. A user (such as an administrator of model training system 100) may define the significance measure.

In a related embodiment, the measure of significance depends on how accurate the forecasting model is. For example, if the error of the forecasting model against historical data representing events that occurred prior to the candidate point in time is relatively small, then even if the difference between an observed value and a forecast value may be relatively small, the detection of a significant event could still be triggered. Conversely, if the error of the forecasting model time is relatively large, then the difference between an observed value and a forecast value must be relatively large in order to trigger a detection of a significant event.

Label Shift Detection: Segment-Wise

In an embodiment, label shift detector 160 performs label shift detection on a per-segment basis. A segment corresponds to a portion of scoring instances and/or training instances that share one or more feature values in common or that share other characteristics (that are related to one or more model features) in common. For example, if a training instance corresponds to a specific user, then one segment may be all users who live in North America and another segment may be all users who live in South America. However, the only possible values for the geography feature may be country. Therefore, even though no scoring instance or training instance indicates North America as a geographic feature value, instances that indicate a country in North America are grouped together if there is a mapping between the country to North America. As another example, if a training instance corresponds to a software application, then one segment may be all applications that comprise two or more stateful operations, another segment may be all applications that comprise only one stateful operation, and another segment may be all applications that do not comprise any stateful operations. The one or more features are of the entity or event for which a prediction is being made, such as a user, a software application, an organization, a country, or a weather phenomenon. Example features for users and/or organizations include geography, industry, job function, employment status, seniority level. and job title.

In order to perform label shift detection on a per-segment basis, a forecasting model is generated for each segment. The data upon which each forecasting model is based is limited to observed labels that correspond to the segment that correspond to the forecasting model. For example, all observed labels in historical results 150 corresponding to users in North America are analyzed to generate a time series of daily sums over a period time. Such a time series of daily sums is used to train a forecasting model for the North America segment. Similarly, all observed labels in historical results 150 corresponding to users in South America are analyzed to generate a time series of daily sums over a (same) period of time. Such a time series of daily sums is used to train a forecasting model for the South America segment.

Label Shift Detection: Exponential Smoothing Methods

In an embodiment, label shift detector 160 (or another component of model training system 100) implements an exponential smoothing algorithm in order to generate a set of forecasting models. Each forecasting model in the set is a state space model and may be represented in a component form that includes three different components: error, trend, and seasonal. Each component has finite variations.

The error component has two possible variations: Additive (A) and Multiplicative (M). The trend component has five possible variations: None (N), Additive (A), Additive damped (Ad), Multiplicative (M) and Multiplicative damped (Md). The seasonal component has three possible variations: None (N), Additive (A) and Multiplicative (M). By considering the variations in the combinations of all three components, there are thirty possible forecasting models in total.

Notation ETS(•,•,•) may be used to denote the thirty possible models. This notation helps in remembering the order in which the components are specified, e.g. Model ETS(A,$A_d$, M) denotes the model with additive errors, additive damped trend, and multiplicative seasonality. The thirty possible models share a general component form. The general component form involves a state vector $x_t=(l_t, b_t, s_t, s_{t-1}, s_{t-m+1})$ and state space equations of the form $$y_t=w(x_{t-1})+r(x_{t-1})\varepsilon_t,$$

$$x_t=f(x_{t-1})+g(x_{t-1})\varepsilon_t,$$

where $y_l, y_t, \ldots, y_{t-1}$ are observed time series data; $\{\varepsilon_t\}$ are independent and identically distributed Gaussian variables with mean 0 and variance σ2; $l_t$ denotes the level of the series at time t; $b_t$ denotes the slope (or growth) of the series at time t; $s_t, s_{t-1}, \ldots, s_{t-m}$ are seasonal components; and m is the length of seasonality. The state vector $x_t$ is unknown, the initial state $x_0=(l_0, b_0, s_0, s_{-1}, \ldots, s_{-m+1})$ is considered as an unknown parameter of the model, and state vector $x_t$ is estimated through the state space equations. The formulation of w(•), r(•), f(•) and g(•) depends on the components variations. The simplest model in exponential smoothing methods is Simple Exponential Smoothing ETS(A,N,N). The component form of the model is $$y_t=l_{t-1}+\varepsilon_t,$$

$$l_t=l_{t-1}+\alpha\varepsilon_t,$$

where $w(x_{t-1})=f(x_{t-1})=l_{t-1}$, $r(x_{t-1})=1$, $g(x_{t-1})=\alpha$, and $\alpha$ is an unknown parameter.

Once the model is specified, the likelihood of the state space model is relatively straightforward to compute and the maximum likelihood estimates of the model parameters may be obtained.

After all or a subset of the thirty models are generated, a model is selected by minimizing one or more selection criteria. Examples of selection criteria include AIC (Akaike's Information Criterion), AICc (AIC corrected for small sample bias), and BIC (Bayesian Information Criterion). Given a collection of models, each selection criterion estimates the quality of each model, relative to each of the other models.

Figure 3:
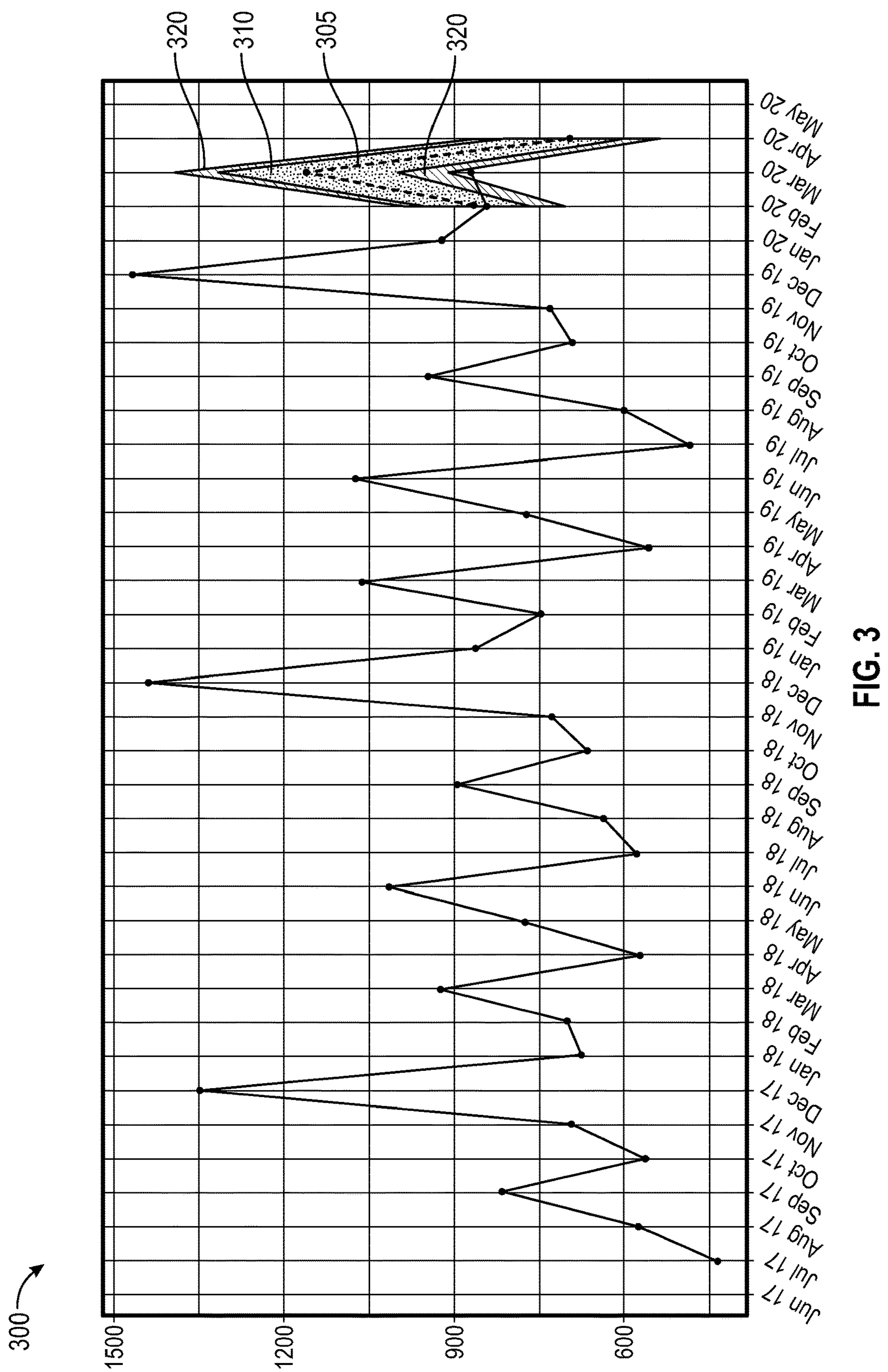
FIG. 3 is an example data plot that depicts historical data and forecast data, in an embodiment.

One attribute of some forecasting models (such as ETS models) is the ability to compute a confidence interval for each forecasted value. The confidence interval may increase for subsequent (in time) forecast values. FIG. 3 is an example data plot 300 that depicts, along with confidence intervals, times series data (specifically, aggregated statistics over time), where some of the time series data pertain to points in time that are prior to a candidate shift point in time, other of the time series data are forecasted values (that are after the candidate shift point in time) (i.e., line 305), and other of the time series data (i.e., the point below outer shared region 320) are based on observed labels and also pertain to points in time that are after the candidate shift point in time.

The forecasting model that generated the forecast values in data plot 300 is denoted as ETS(M,N,M). The x-axis is time and is divided into months, while the y-axis is an aggregated statistic that represents a number of events that occurred in a monthly period. While this forecasting model may have been generated on monthly data, the forecasting model may have instead been generated on a weekly or daily period. However, averaging the events on a monthly basis removes significant variation in such finer granularity data and reduces the effect of outliers, which, if used to train the forecasting model, might make the forecasting model relatively inaccurate, increasing any confidence intervals and, therefore, the ability to detect significant label shift.

In this depicted example, the candidate shift point in time is February 2020 and there are three forecast values (making up line 305): one for February of 2020, one for March of 2020, and one for April of 2020. Data plot 300 also shows two aggregated statistics, each of which is based on observed labels that pertain to events associated with February of 2020 (i.e., in inner shaded region 310) or March of 2020 (i.e., below outer shaded region 320).

As partially noted, data plot 300 depicts three shaded regions beginning with the candidate shift point in time. The inner shaded region 310 indicates a confidence interval of 80%, indicating that, statistically speaking, the forecasting model is 80% confident that an observed (e.g., aggregated) value will fall within inner shaded region 310. The outer shaded regions 320 indicate a confidence level of 95%, indicating that, statistically speaking, the forecasting model is 95% confident that an observed (e.g., aggregated) value will fall within outer shaded regions 320 or inner shaded region 310.

In an embodiment, if an aggregated statistic based on observed labels falls outside a particular confidence interval (e.g., 95%), then label shift detector 160 determines that there is significant label shift, which triggers label shift adjustor 170. In the example of data plot 300, the second aggregated statistic (corresponding to March of 2020) after the candidate shift point in time is outside outer shaded regions 320, indicating that the second aggregate statistic represents significant label shift, or an anomaly.

In a related embodiment, if multiple (e.g., consecutive) aggregated statistics based on observed labels fall outside one or more confidence levels, then label shift detector 160 determines that there is significant label shift. For example, not one of the aggregated statistics falls outside a larger confidence interval (e.g., 95%), but two consecutive aggregated statistics fall outside a smaller (though still relatively large) confidence interval (e.g., 80%). In such a scenario, label shift adjustor 170 may be triggered.

Also, which side of the forecast value an aggregated value may fall on (e.g., greater than or less than the forecast value) may dictate whether any label shift adjustment should be made. For example, if an aggregated value is outside a particular confidence interval and is greater than a corresponding forecast value, then no label shift adjustment is triggered. On the other hand, if an aggregated value is outside a particular confidence interval and is less than a corresponding forecast value, then label shift adjustment is triggered.

In an embodiment, a forecaster 162 generates a different forecasting model for each segment of multiple segments. In the example of ETS models, the forecasting model for one segment may have different ETS components than the forecasting model for another segment. For example, a forecasting model for a first segment may be denoted as ETS(M,N,M) while a forecasting model for a second segment may be denoted as ETS(A,N,N). In other words, thirty possible forecasting models are generated for the first segment (based on the training instances that correspond to the first segment) and the forecasting model denoted as ETS (M,N,M) is ultimately selected for the first segment based on the described selection criteria. Meanwhile thirty possible forecasting models are generated for the second segment (based on the training instances that correspond to the second segment) and the forecasting model denoted as ETS(A,N,N) is ultimately selected for the second segment based on the same selection criteria.

Label Shift Adjustment

In an embodiment, label shift adjuster 170 adjusts training instances in historical training data 110 in response to label shift detector 160 detecting large or significant label shift in at least a portion of historical results 150. "Adjusting" or modifying a training instance may involve modifying an importance weight of the training instance or modifying a label of the training instance. An importance weight of a training instance indicates how much coefficients or weights of features are adjusting during training of a machine-learned model based on the training instance. The higher the importance weight, the greater the adjustment of the coefficients or weights of the features of the model. Conversely, the lower the importance weight, the lesser the adjustment of the coefficients or weights of the features of the model.

In an embodiment where are labels are modified, then only non-zero labels may be modified. For example, if a positive label is 1, then a new value for a positive label is $l^*w$, where w may be $0<w<1$. If a negative label is 0, then the negative label remains unmodified. Alternatively, the negative label may be modified to become a negative number.

There are multiple ways to adjust or modify training instances in historical training data 110. For example, a ratio of (1) an aggregated statistic that is based on observed labels that were generated after the candidate shift point in time to (2) a forecast value that corresponds to the same time period as the aggregated statistic is computed and applied to importance weights in the training instances. As a specific example, if 54 is the aggregated statistic and the forecast value is 97, then the importance weight of each training instance is assigned the value of 54/97. However, such an adjustment is not statistically or mathematically sound.

The following mathematical formulas and notations are used to formulate the label shift problem. X is the feature vector and Y is the label, where X and Y have a joint distribution p(X, Y) in the historical data set and q(X, Y) is the joint distribution in the scoring data set (e.g., future scoring data set 180), and l a loss function defined as $l: Y \times Y \rightarrow R^+$. l is a loss function that takes its input from a two-dimensional space Y×Y, and its output is in a one-dimensional space $R^+$ (i.e., non-negative real number space). One example of the loss function l is $l(f(X), Y)-(f(X)-Y)^2$, where l takes two values f(X) and Y from the two-dimensional space Y×Y as the input and produces a non-negative real number $(f(X)-Y)^2$ as the output, where f(X) stands for the predicted label via model f.

The objective of predictive modeling is to learn a model $f: X \rightarrow Y$ that minimizes $E_{X, Y\sim p} l(f(X), Y)$, where $E_{X, Y\sim p} l(f(X), Y)$ is the expectation of the loss function (f(X), Y), given X and Y subject to a joint distribution p. E stands for "expectation" and ~ stands for "subject to a distribution." In the ideal case where p(X, Y)=q(X, Y), the pre-trained model f is still valid in the scoring data set (e.g., future scoring data set 180). However, the pre-trained model f is not valid in the scenario when the label shift issue exists. As detected by one or more forecasting models, it is possible that the proportion of positive labels could be much larger in the historical dataset than in the scoring data set, which leads to the potential logic change of the label derivation from the features. In other words, p(Y|X)!=q(Y|X), which leads to p(X, Y)!=q(X, Y). In this case, the optimal model $\tilde{f}$ for the scoring data set is the minimizer of $E_{X, Y\sim q} l(\tilde{f}(X), Y)$, which should be different from the model f learned from the historical dataset.

A challenge in minimizing $E_{X, Y\sim q} l(f(X), Y)$ is the lack of information on the distribution of Yin the scoring data set, since there are no observations of Yin practice. However, observations from the historical data can be leveraged to help estimate the distribution of Y in the scoring data set, and use the following formula:

$$E_{X,Y\sim q} l(\tilde{f}(X),Y)=E_{X,Y\sim p}(q(X,Y)/p(X,Y))l(f(X),Y) \quad (1)$$

to obtain the optimal model $\tilde{f}$ for the scoring dataset.

Label Shift Adjustment: Black-Box Shift Estimation

There are systematic and mathematical techniques that may be used to determine how much the importance weights in training instances should be adjusted and modified. Black-Box Shift Estimation (BBSE) is one such technique. A key assumption in BBSE is called label shift assumption: p(X|Y)=q(X|Y). This implies that the logics of the feature derivation from the labels are consistent between the historical dataset and the scoring dataset. While this assumption looks reasonable in many use cases, there is a potential drawback: the label shift assumption may not hold globally across all the segments, where each training instance is assigned to one of multiple segments. Indeed, the change of label distribution might vary significantly across different segments. For example, in some geographic regions, in response to a significant global change, people's behavior may change significantly while people's behavior in other geographic regions might not change significantly.

Label Shift Adjustment: Segment-Level Adjustment

In an embodiment, the BBSE approach is extended to account for different segments. The above label shift assumption (i.e., that different segments behave differently) is expressed using the following mathematical expressions. Assume the feature vector $X=(X_c, X_s)$, where $X_s$ stands for the one or more features that correspond to a segment (e.g., geographic region or geographic region and industry) and takes values from a discrete set S={1, . . . , s}, and where $X_c$ stands for the remaining features in machine-learned model 130. The label shift assumption under segmentation is: $p(X_c|Y, X_s)=q(X_c|Y, X_s)$. Plugging in this assumption into formula (1) leads to $$E_{X,Y\sim q} l(\tilde{f}(X),Y)=E_{X,Y\sim p}(q(X,Y)/p(X,Y))l(\tilde{f}(X),Y)=E_{X,Y\sim p}(q(X_s,Y)/p(X_s,Y))l(\tilde{f}(X),Y)=E_{X,Y\sim p}[(q(Y|X_s)q(X_s))/(p(Y|X_s)p(X_s))]l(\tilde{f}(X),Y) \quad (2)$$

and the key to obtain the optimal model $\tilde{f}$ is to estimate $w_s(Y):=q(Y|X_s)/p(Y|X_s)$. From $q(f(X)|X_s)$, the following may be derived (assuming Y takes values from a discrete set K={1, . . . , k}, which means this is a multi-class classification problem with k classes:

$$q(f(X)|X_s)=\Sigma q(f(X)|Y,X_s)q(Y|X_s)=Y\in K$$

$$\Sigma p(f(X)|Y,X_s)q(Y|X_s)=Y\in K$$

$$\Sigma p(f(X),Y|X_s)w_s(Y).\ Y\in K$$

Also, we denote $q_s(f(X)):=q(f(X)|X_s)$ and $C_{p,s}(f(X), Y):=[p(f(X)=i, Y=j|X_s)]_{k\times k}$, then $w_s(Y)=C_{p,s}(f(X), Y)^{-1}q_s(f(X))$. Note that $C_{p,s}(f(X), Y)$ is a confusion matrix (of size k×k) of model f under distribution p within segment s and $q_s(f(X))$ is a k-dimensional vector and is a predicted label distribution of model f under distribution q within segments. The value of k indicates the number of classifications predicted from machine-learned model 130. Thus, if machine-learned model 130 is a binary classification model, then k=2. A confusion matrix is a specific table layout that allows visualization of the performance of an algorithm, typically a supervised learning one. Each row of the matrix represents the instances in a predicted class while each column represents the instances in an actual class (or vice versa). The name "confusion matrix" stems from the fact that the matrix makes it easy to see if a system is confusing two classes (i.e. commonly mislabeling one as another). Although typically used for visualization, a confusion matrix is used here for calculating $w_s(Y)$, where $w_s(Y)=C_{p,s}(f(X), Y)^{-1}q_s(f(X))$.

It is assumed that in segment s there are (a) $n_s$ samples in the historical dataset $\{(x_{1,s}, y_{1,s}), \ldots, (x_{n_s,s}, y_{n_s,s})\}$ drawn from p(X, Y) and (b) $m_s$ samples in the scoring dataset $\{x_{1,s}', \ldots, x_{m_s,s}'\}$ drawn from q(X). Then $\hat{C}_{p,s}(f(X),Y)=[\Sigma_{l=1}^{n_s} 1\{f(x_{l,s})=i \ \&\ y_{l,s}=j\}/n_s]_{k\times k}$, and $\hat{q}_s(f(X))=[\Sigma_{l=1}^{m_s}\{f(x_{l,s}')=i\}/m_s]_{k\times i}$. Thus $\hat{w}_s(Y)=\hat{C}_{p,s}(f(X),Y)^{-1}\hat{q}_s(f(X))$. The symbol '^' stands for "the estimate." For example, Z is an unknown variable and $\hat{Z}$ is an estimate of Z based on some observed samples. Finally, model $\tilde{f}$ is obtained by minimizing a weighted sum of loss functions $$\sum_{s=1}^{S}\sum_{l=1}^{n_s} \hat{w}_S(y_{l,s})\frac{\hat{q}(X_s)}{\hat{p}(X_s)} l(f(x_{l,s}), y_{l,s})$$

according to formula (2), where $\hat{p}(X_s)$ and $\hat{q}(X_s)$ are estimated as the proportion of segment s in the historical dataset and in the scoring dataset respectively.

Therefore, to compute an amount to adjust a training instance (in historical training data 110) that is associated with segments, the following are inputs to label shift adjustor 170: 1) historical training data 110; 2) a validation/testing data set in each segment s (s=1, . . . , S): $\{(x_{1,s},y_{1,s}), \ldots, (x_{n_s,s}, y_{n_s,s})\}$, $y_{i,s}\in\{1, \ldots, k\}$; and 3) a scoring dataset in each segments (s=1, . . . , S): $\{x_{1,s}', \ldots, x_{m_s,s}'\}$.

Figure 4:
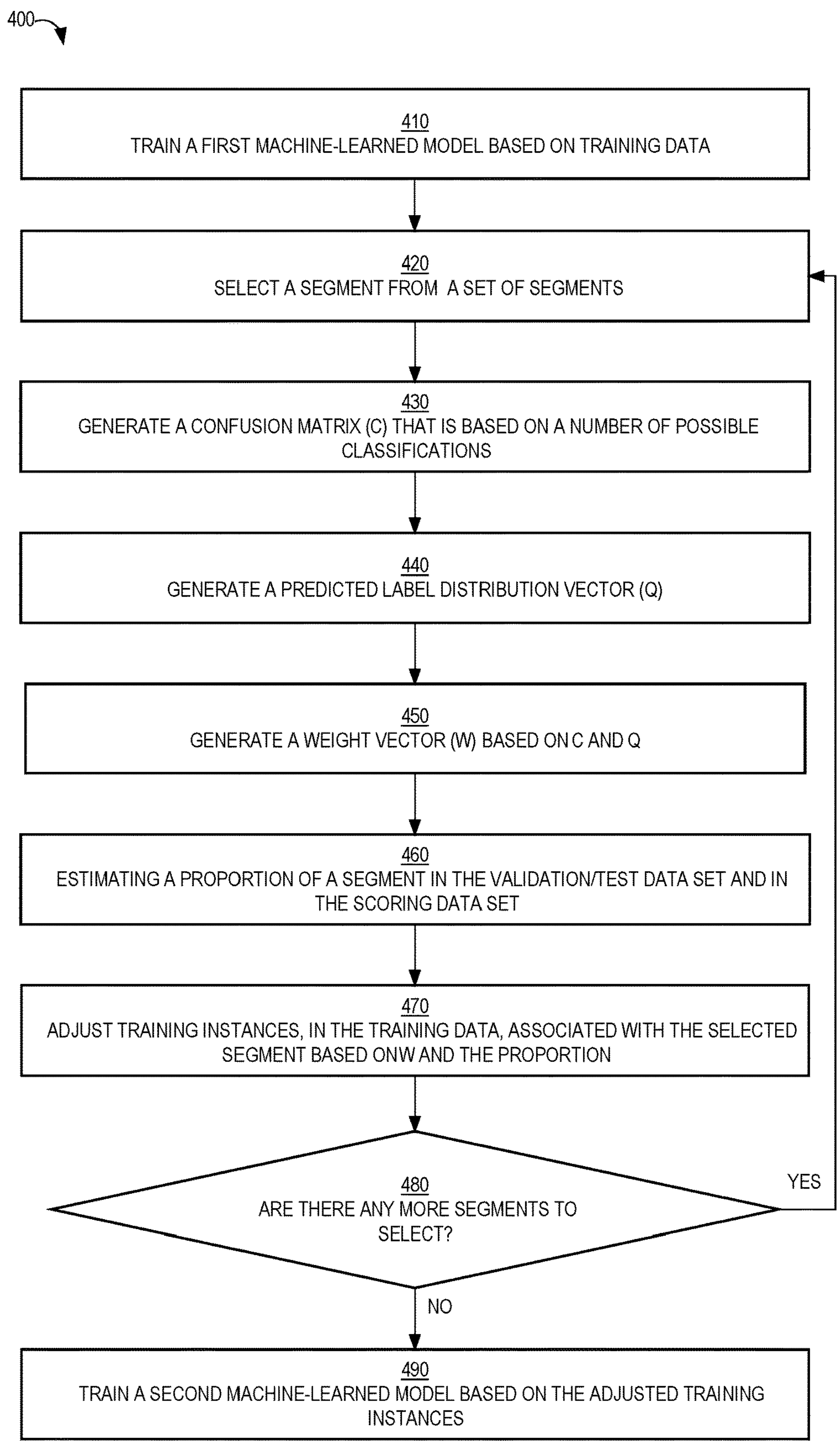
FIG. 4 is a flow diagram that depicts an example process for adjusting training instances on a segment-wise basis, in an embodiment.

FIG. 4 is a flow diagram that depicts an example process 400 for adjusting training instances on a segment-wise basis, in an embodiment. Process 400 may be implemented by label shift adjuster 170.

At block 410, a machine-learned model (e.g., machine-learned model 130) is trained using one or more machine learning techniques is based on training data (e.g., historical training data 110).

At block 420, a segment from a set of segments is selected. Initially, at the first iteration of block 420, the set of segments may include all possible segments. For example, if the segments are defined based on the geography feature and there are five possible values for the geography feature, then there are initially five segments at the beginning of process 400.

At block 430, a k×k confusion matrix $\hat{C}_s$ is generated where $[\hat{C}_s]_{ij}=\Sigma_{l=1}^{n_s}1\{f(x_{l,s})=i \ \& \ y_{l,s}=j\}/n_s$.

At block 440, a k-dimensional predicted label distribution vector $\hat{q}_s$ is generated where $[\hat{q}_s]_i=\Sigma_{l=1}^{m_s}1\{f(x_{l,s}')=i\}/m_s$. $\hat{q}_s$ is an estimate of the predicted label distribution $q_s$.

At block 450, a k-dimensional weight vector $\hat{w}_s=\hat{C}_s^{-1}\cdot\hat{q}_s$ is generated. $\hat{w}_s$ is the estimated weights for k classes (and each dimension corresponds to one class) applied on the training instances within segment s.

At block 460, a proportion of the selected segment s in the validation/testing dataset $\hat{p}(s)$ and in the scoring dataset $\hat{q}(s)$ is estimated. $\hat{p}(s)$ is the proportion of instances within segment s in the validation/testing dataset (i.e., $$\hat{p}(s) = \frac{n_s}{\sum_{l=1}^{s} n_l},$$

where $n_s$ is the number of instances within segment s in validation/testing dataset and $\Sigma_{l=1}^{S}n_l$ is the total number of instances in validation/testing dataset). $\hat{q}(s)$ is the proportion of instances within segments in the scoring dataset (i.e., $$\hat{q}(s) = \frac{m_s}{\sum_{l=1}^{s} m_l},$$

where $m_s$ is the number of instances within segment s in scoring dataset and $\Sigma_{l=1}^{S}m_1$ is the total number of instances in scoring dataset). It is not recommended that $\hat{p}(s)$ be estimated from the training dataset because the weight vector $\hat{w}_s$ is estimated from the validation/testing dataset and the estimation process should be consistent.

At block 470, training instances in the training data that correspond to the selected segments are adjusted by $\hat{w}_s\cdot(\hat{q}(s)/\hat{p}(s))$. For example, a portion of historical training data 110 that corresponds to the selected segment are modified by the product $\hat{w}_s\cdot(\hat{q}(s)/\hat{p}(s))$. Such modification may involve multiplying an importance weight of each training instance associated with the selected segment s by the above product.

Thus, all training instances in segment s may be weighted according to the k-dimensional vector $$\hat{w}_s\cdot\frac{\hat{q}(s)}{\hat{p}(s)}.$$

For example, each training instance in segment s with its label Y taking value v (v is one of the k values in the label set {1, . . . , k}) will be assigned the weight $$\left[\hat{w}_s\cdot\frac{\hat{q}(s)}{\hat{p}(s)}\right]_v,$$

i.e., the v-th element in the k-dimensional vector $$\hat{w}_s\cdot\frac{\hat{q}(s)}{\hat{p}(s)}.$$

Block 470 may involve including the modified training instances in adjusted training data 112.

At block 480, it is determined whether there are any more segments that have not yet been selected. If so, then process 400 proceeds to block 420 where another segment is selected. If the determination in block 480 is negative, then process 400 proceeds to block 490. When process 400 proceeds to block 490, all (or potentially all) training instances are modified.

At block 490, a new model is trained based on the adjusted or modified training data. For example, model trainer 120 trains new model 132 based on adjusted training data 112. The new model may have the same set of features as the machine-learned model in block 410 or may have a different set of features as the machine-learned model. For example, some features may have been added or removed to the set of features upon which machine-learned model 130 was trained. Scoring instances from future scoring data set 180 may then be input into new model 132 to generate a score or prediction for each.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
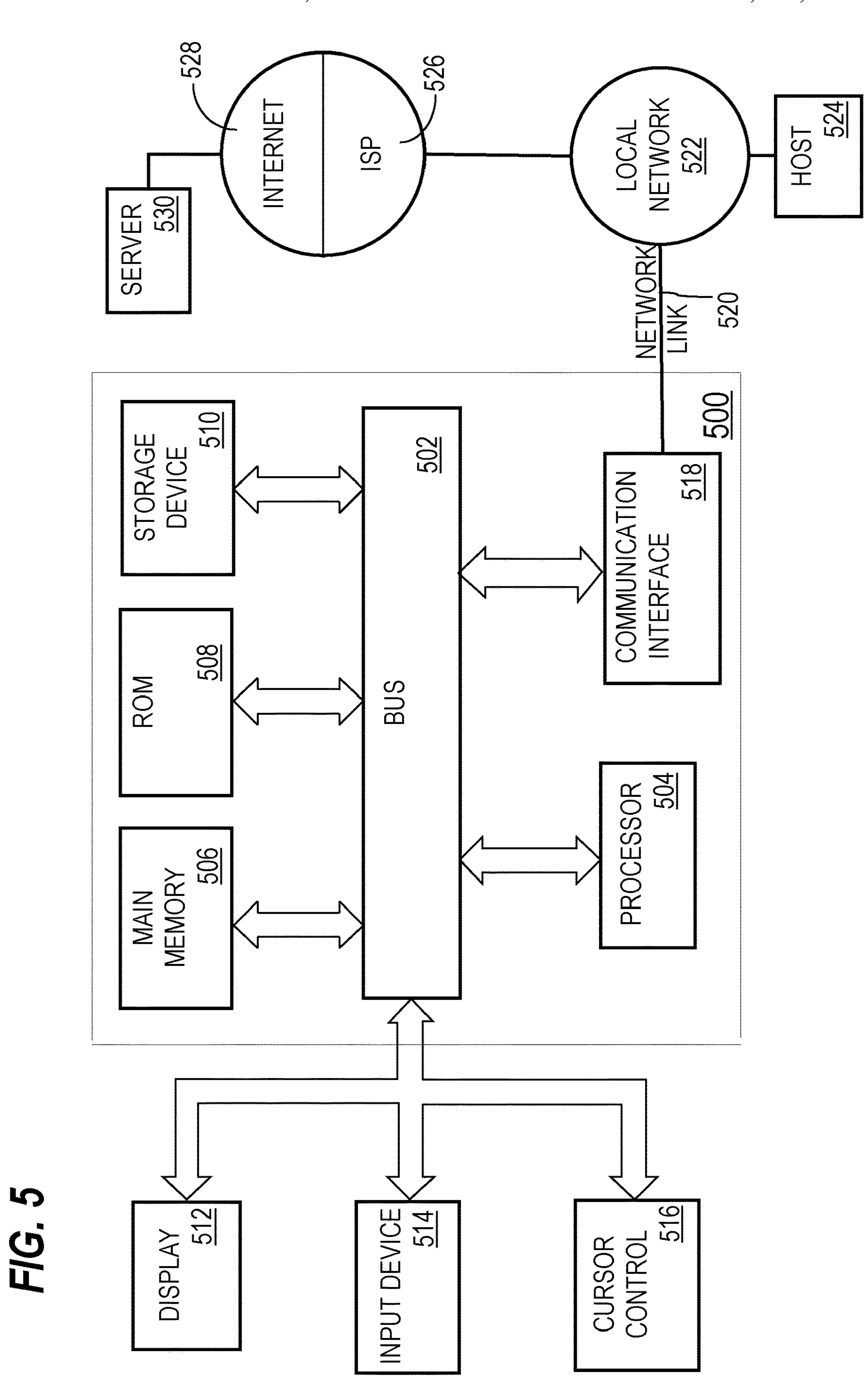
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

for each scoring instance in multiple scoring instances in a scoring data set, using a first machine-learned model to generate a predicted label for said each scoring instance, wherein the first machine-learned model is trained using one or more machine learning techniques based on a plurality of training instances, each of which includes an observed label;

generating a forecasting model based on time-series data that is based on first observed label data that corresponds to a first period of time;

using the forecasting model to generate a forecast;

performing a comparison between the forecast and second observed data that corresponds to a second period of time that is subsequent to the first period of time;

detecting a shift in observed labels based on the comparison;

in response to detecting the shift in observed labels, for each segment of one or more segments in a plurality of segments:

identifying a portion of training data that corresponds to said each segment;

for each training instance in a subset of the portion of training data:

adjusting said each training instance to generate an adjusted training instance;

adding the adjusted training instance to a final set of training data;

using the one or more machine learning techniques to train a second machine-learned model based on the final set of training data;

wherein the method is performed by one or more computing devices.

2. The method of claim 1, wherein adjusting said each training instance to generate the adjusted training instance comprises modifying an importance weight of said each training instance.

3. The method of claim 1, further comprising:

determining a confidence interval for the forecast using the forecasting model;

wherein performing the comparison comprises determining whether a portion of the second observed data is outside the confidence interval;

wherein detecting the shift in observed labels is based, at least in part, on determining that the portion of the second observed data is outside the confidence interval.

4. The method of claim 1, wherein:

generating the forecasting model comprises generating a plurality of forecasting models based on a plurality of time series data, wherein each forecasting model in the plurality of forecasting models is based on different time series data in the plurality of time series data, wherein each time series data in the plurality of time series data corresponds to a different segment of the plurality of segments;

using the forecasting model to generate the forecast comprises using the plurality of forecasting models to generate a plurality of forecasts;

performing the comparison comprises performing a plurality of comparisons, each between a different forecast of the plurality of forecasts and time series data of the plurality of time series data;

detecting the shift in observed labels comprises detecting shift in observed labels of a first segment of the plurality of segments and detecting no shift in observed labels of a second segment of the plurality of segments.

5. The method of claim 4, wherein generating the forecasting model comprises:

generating a plurality of forecasting models;

selecting the forecasting model from among the plurality of forecasting models based on accuracy of each forecasting model, in the plurality of forecasting models, relative to the time series data.

6. The method of claim 1, further comprising:

identifying a particular point in time;

identifying the first observed label data based on the particular point in time, wherein data within the first observed label data is associated with a time that is before the particular point in time;

identifying the second observed data based on the particular point in time, wherein data within the second observed data is associated with a time that is after the particular point in time.

7. The method of claim 6, wherein the particular point in time is specified in user input or is automatically determined not based on user input.

8. The method of claim 1, wherein adjusting said each training instance comprises using a black-box shift estimation technique.

9. The method of claim 1, wherein the plurality of segments are based on one or more of geographic region, industry, employment status, job function, seniority level, or job title.

10. One or more storage media storing instructions which, when executed by one or more processors, cause:

for each scoring instance in multiple scoring instances in a scoring data set, using a first machine-learned model to generate a predicted label for said each scoring instance, wherein the first machine-learned model is trained using one or more machine learning techniques based on a plurality of training instances, each of which includes an observed label;

generating a forecasting model based on time-series data that is based on first observed label data that corresponds to a first period of time;

using the forecasting model to generate a forecast;

performing a comparison between the forecast and second observed data that corresponds to a second period of time that is subsequent to the first period of time;

detecting a shift in observed labels based on the comparison;

in response to detecting the shift in observed labels, for each segment of one or more segments in a plurality of segments:

identifying a portion of training data that corresponds to said each segment;

for each training instance in a subset of the portion of training data:

adjusting said each training instance to generate an adjusted training instance;

adding the adjusted training instance to a final set of training data;

using the one or more machine learning techniques to train a second machine-learned model based on the final set of training data.

11. The one or more storage media of claim 10, wherein adjusting said each training instance to generate the adjusted training instance comprises modifying an importance weight of said each training instance.

12. The one or more storage media of claim 10, wherein the instructions, when executed by the one or more processors, further cause:

determining a confidence interval for the forecast using the forecasting model;

wherein performing the comparison comprises determining whether a portion of the second observed data is outside the confidence interval;

wherein detecting the shift in observed labels is based, at least in part, on determining that the portion of the second observed data is outside the confidence interval.

13. The one or more storage media of claim 10, wherein:

generating the forecasting model comprises generating a plurality of forecasting models based on a plurality of time series data, wherein each forecasting model in the plurality of forecasting models is based on different time series data in the plurality of time series data, wherein each time series data in the plurality of time series data corresponds to a different segment of the plurality of segments;

using the forecasting model to generate the forecast comprises using the plurality of forecasting models to generate a plurality of forecasts;

performing the comparison comprises performing a plurality of comparisons, each between a different forecast of the plurality of forecasts and time series data of the plurality of time series data;

detecting the shift in observed labels comprises detecting shift in observed labels of a first segment of the plurality of segments and detecting no shift in observed labels of a second segment of the plurality of segments.

14. The one or more storage media of claim 13, wherein generating the forecasting model comprises:

generating a plurality of forecasting models;

selecting the forecasting model from among the plurality of forecasting models based on accuracy of each forecasting model, in the plurality of forecasting models, relative to the time series data.

15. The one or more storage media of claim 10, wherein the instructions, when executed by the one or more processors, further cause:

identifying a particular point in time;

identifying the first observed label data based on the particular point in time, wherein data within the first observed label data is associated with a time that is before the particular point in time;

identifying the second observed data based on the particular point in time, wherein data within the second observed data is associated with a time that is after the particular point in time.

16. The one or more storage media of claim 15, wherein the particular point in time is specified in user input or is automatically determined not based on user input.

17. The one or more storage media of claim 10, wherein adjusting said each training instance comprises using a black-box shift estimation technique.

18. The one or more storage media of claim 10, wherein the plurality of segments are based on one or more of geographic region, industry, employment status, job function, seniority level, or job title.

* * * * *